Feb. 28, 1956 E. WOLF 2,736,516
STEERABLE AIRPLANE LANDING WHEEL
Filed April 27, 1953 2 Sheets-Sheet 1

INVENTOR.
Edward Wolf
BY
A.H. Oldham
ATTORNEY

Feb. 28, 1956   E. WOLF   2,736,516
STEERABLE AIRPLANE LANDING WHEEL
Filed April 27, 1953   2 Sheets-Sheet 2

INVENTOR.
Edward Wolf
BY
A H Oldham
ATTORNEY

United States Patent Office 2,736,516
Patented Feb. 28, 1956

2,736,516

STEERABLE AIRPLANE LANDING WHEEL

Edward Wolf, Cuyahoga Falls, Ohio, assignor to Goodyear Aircraft Corporation, Akron, Ohio, a corporation of Delaware Application April 27, 1953, Serial No. 351,096

4 Claims. (Cl. 244—50)

This invention relates to an improvement of hydraulically steerable airplane landing wheels and in particular to such wheels having an internal castering axis.

Heretofore it has been known to use hydraulic torque actuators for steering airpline nosewheels. However, in these cases the hydraulic actuator was attached to the oleo strut so that the wheel support, together with the wheel, had to be turned to steer the wheel. This arrangement has obvious drawbacks, because of the large swiveling mass and the great distance through which the torque must be transmitted to the wheel giving rise to shimmying. It is further known to provide a self-castering airplane landing wheel with a king pin positioned diametrically within the wheel.

It is the general object of the invention to provide a more compact steerable landing wheel construction whereby the foregoing and other difficulties of and prior art practices are avoided by employing for castering the wheel an internally arranged king pin as shaft for a hydraulic torque motor or wheel actuator so that the force for steering the wheel is applied directly thereto and shimmying of the wheel is eliminated to the greatest possible extent since in addition the hydraulic actuator also serves as a damper.

Another object of the invention is to simplify the steering mechanism for hydraulically operated aircraft landing wheels.

The aforesaid objects of the invention and other objects which will become apparent as the description proceeds are achieved by providing the wheel axle having at its free end a pair of forked flanges with a king pin passing therethrough in splined engagement therewith and in fixed position about which is swingable a hub carrying the wheel rotatably mounted thereon. A vane type hydraulic torque actuator or motor, consisting of a vane splined in fixed position to the king pin and of a swingable housing enclosing the vane and fastened to the swingable hub, is mounted between the axle flanges on the king pin to localize the steering force completely within the hydraulic torque actuators.

Figure 2:
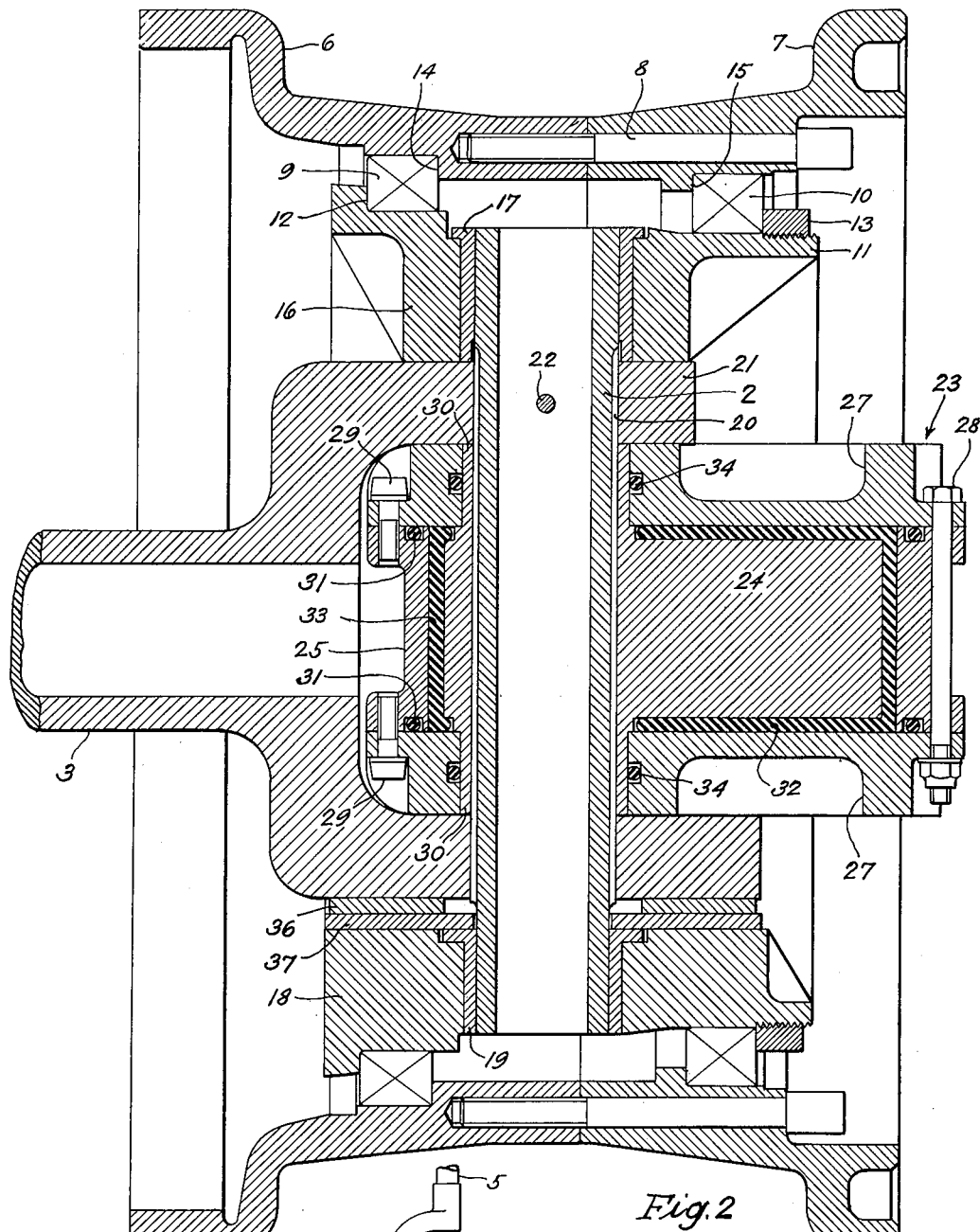
Figure 1:
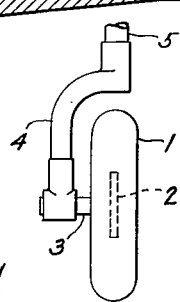
Figure 3:
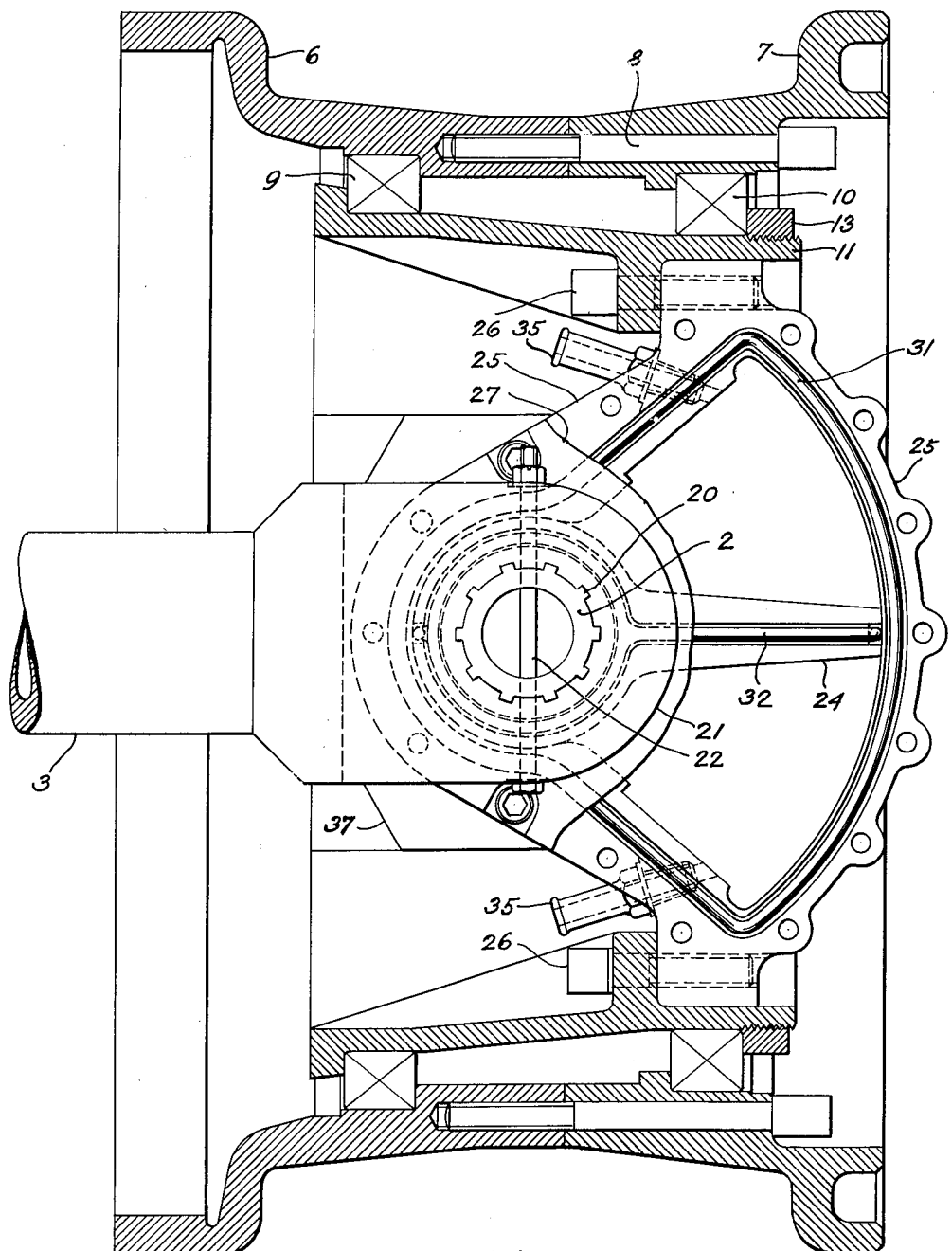

For a better understanding of the invention reference should be had to the accompanying drawings, wherein Fig. 1 shows a front view of one embodiment of the invention is the form of an airplane nosewheel attached to an oleo strut, Fig. 2 is a diametrical vertical cross-sectional view of the wheel, Fig. 3 is a diametrical horizontal cross-sectional view of the wheel showing the wheel axle and the hydraulic actuator, having its top cover partially broken off, in top view.

With specific reference to the form of the invention illustrated in the drawings the numeral 1 indicates an airplane nosewheel turnable about a king pin 2 and supported by an axle 3 fixed to a frame 4 attached to a non-rotatable but vertically movable oleo strut 5. The wheel rim composed of parts 6 and 7 united by bolts 8 is rotatably mounted by bearings 9 and 10 on the hub 11. The bearings 9 and 10 resting, respectively, against the shoulder 12 and a ring 13 threaded to the hub 11, and against shoulders 14 and 15 on the rim parts 6 and 7, respectively, control the lateral position of the rim relative to the hub. The hub 11 is provided with an upper bearing 16 containing a bushing 17 and with a lower bearing 18 containing a bushing 19 in pivotal engagement with the king pin 2 which is provided with splines 20 to prevent it from turning in the fork 21 of shaft 3 and fastened to the fork 21 by a bolt 22 to hold it vertically in position. Inserted in the fork 21 and concentric with the king pin axis is a hydraulic torque actuator 23, designated as a whole, and known on the market as Hydromotor. The vane 24 of the torque actuator 23 is splined to the king pin 2 in fixed position and enclosed by a housing. This housing consists of a casing 25, open at top and bottom, which is attached by bolts 26 to the hub 11, and of top and bottom heads 27 fastened to the casing 25 by bolts 28 and 29. The actuator housing is swingable together with the hub 11 about bearings 30 extending from the vane 24. O-shaped packings 31 seal the heads 27 against the casing 25 and packings 32 and 33 inserted in grooves of the vane 24 seal the spaces opposite of the vane against each other, whereas packing rings 34 seal the bearings 30 of the vane against the heads 27. Both sides of the casing 25 are provided with inlet and outlet fittings 35 for the attachment of flexible hose (not shown) supplying the torque actuator 23 from a remote source with operating fluid. The load of the airplane is transmitted to the wheel hub 11 by thrust bearing plates 36 and 37, the former being fastened to the axle fork 21 and the latter to the hub 11. The hydraulic torque actuator 23 is manipulated by a conventional control system, not a part of this invention, which supplies the actuator either from one side or the other with pressurized oil while the oil drains from the opposite side.

It will be recognized that the objects of the invention of obtaining a most simple and economical construction of a steerable airplane landing wheel have been achieved by the direct connection of a hydraulic torque actuator to the wheel hub and to a king pin fixed in the wheel axle and in diametrical position of the wheel. Because by the elimination of all parts between the hydraulic torque actuator and the landing wheel the steering response is immediate by the absence of torque forces in the supporting strut of the wheel and, therefore, shimmying of the wheel is practically eliminated with the hydraulic torque actuator serving additionally as a damper.

Although the invention has been described for an airplane nosewheel it may be applied to any other landing wheel.

While certain representative embodiments and details have been shown for the purpose of illustrating the invention, it will be apparent to those skilled in this art that various changes and modifications may be made therein without departing from the spirit or scope of the invention.

What is claimed:

1. In combination with a steerable airplane landing wheel an axle provided with a forked end, a king pin, having a splined middle portion and journaled end portions, inserted in splined engagement into said forked axle end and fixed thereto with said journaled portions extending therefrom, a hub, having said wheel rotatably mounted thereon, being swingable about said journaled pin portions, and an arcuate hydraulic torque motor, mounted between said forked end and using the king pin as shaft in actuating engagement between said hub and said king pin for steering the wheel.

2. In combination with a steerable airplane landing wheel an axle ending in vertically forked flanges, a rotatably fixed king pin passing in splined engagement therewith through said flanges and being fixed thereto, a hub rotatably carrying said landing wheel and being swingably mounted on the king pin, and an arcuate hydraulic torque motor of the vane type inserted between said flanges and having its vane splined in fixed position to the king pin and its housing attached to the hub for arcuate movement about the king pin, and connecting means on said torque motor for supplying it with fluid pressure from a remote source for steering the wheel.

3. For a steerable airplane landing wheel an axle ending in a pair of forked flanges, a king pin passing through said flanges in splined engagement therewith and being fixed thereto, a hub carrying said wheel rotatably mounted thereon, said hub being journaled on the king pin diametrically positioned therein, and an arcuate torque motor, including a vane and a housing therefor, inserted between said flanges, the vane being mounted torque-resistant on said king pin and the housing being fixed to said hub for steering the wheel when fluid pressure is applied to the torque motor.

4. For a steerable airplane landing wheel an axle member, a hub member, a king pin fixed to one of said members and rotatably received in the other so as to mount the hub member for steering movement on the axle member, a wheel rotatably mounted on the hub member, an arcuate torque motor including a vane and a housing therefor, the vane being secured to one of said members and the housing being secured to the other of said members, and means for applying fluid pressure to the torque motor.

References Cited in the file of this patent

UNITED STATES PATENTS

| 1,116,975 | Bergesen | Nov. 10, 1914 |
| 2,597,366 | Nordenstam | May 20, 1952 |

FOREIGN PATENTS

| 542,648 | Great Britain | Jan. 12, 1942 |